US009051869B2

(12) United States Patent
Zhang

(10) Patent No.: US 9,051,869 B2
(45) Date of Patent: Jun. 9, 2015

(54) EXHAUST RAIN CAP ASSEMBLY WITH CHANNEL VANE MEMBER

(71) Applicant: MERCURY PRODUCTS CORP., Schaumburg, IL (US)

(72) Inventor: Harry Zhang, Clarendon Hills, IL (US)

(73) Assignee: Mercury Products Corp., Schaumburg, IL (US)

( * ) Notice: Subject to any disclaimer, the term of this patent is extended or adjusted under 35 U.S.C. 154(b) by 0 days.

(21) Appl. No.: 14/308,109

(22) Filed: Jun. 18, 2014

(65) Prior Publication Data

US 2015/0020510 A1     Jan. 22, 2015

Related U.S. Application Data

(60) Provisional application No. 61/856,176, filed on Jul. 19, 2013, provisional application No. 61/935,599, filed on Feb. 4, 2014.

(51) Int. Cl.
    *F01N 13/08*      (2010.01)
    *B60K 13/04*      (2006.01)

(52) U.S. Cl.
    CPC .............. *F01N 13/085* (2013.01); *B60K 13/04* (2013.01)

(58) Field of Classification Search
    CPC .............. F01N 13/085; F01N 2240/36; F01N 2260/26; F01N 2590/08; F16K 15/03; F16K 17/12; F16L 55/1018; F23J 13/08; F23L 17/10; Y10S 137/904
    USPC ......... 137/520, 527, 527.8; 251/87, 247, 287, 251/303, 338; 454/5; D19/194

See application file for complete search history.

(56) References Cited

U.S. PATENT DOCUMENTS

| | | | |
|---|---|---|---|
| 2,983,216 A | 4/1960 | Stade et al. | |
| 3,274,917 A | 9/1966 | Tolbert, Sr. | |
| 3,363,537 A | 1/1968 | Penning | |
| 4,226,173 A | 10/1980 | Khosropour | |
| 4,255,928 A * | 3/1981 | Jones et al. | 60/324 |
| 4,383,478 A | 5/1983 | Jones | |
| 4,495,859 A | 1/1985 | Janke | |
| 4,580,488 A | 4/1986 | Rose | |
| 6,921,327 B2 * | 7/2005 | Urash | 454/5 |

FOREIGN PATENT DOCUMENTS

CA     987187     4/1976

OTHER PUBLICATIONS

U.S. Commissioner for Patents, International Search Report and Written Opinion, issued Nov. 21, 2014 in corresponding PCT Application No. PCT/US14/46822 filed Jul. 16, 2014.

* cited by examiner

*Primary Examiner* — Audrey K Bradley
*Assistant Examiner* — Jonathan Matthias
(74) *Attorney, Agent, or Firm* — Patzik, Frank & Samotny Ltd.

(57) ABSTRACT

An exhaust rain cap assembly for covering the end of an exhaust conduit, the exhaust rain cap assembly including a channel vane member comprising a channel vane for attaching to the lid and stop member. The exhaust rain cap assembly may also include a counterbalance that interacts with a spacer, bushing or other stop member to provide for the lid to stop in a plurality of positions including a closed position, a first open position for when the engine is idling, and a second open position when the engine is in operating.

10 Claims, 6 Drawing Sheets

EXHAUST RAIN CAP ASSEMBLY WITH CHANNEL VANE MEMBER

RELATED APPLICATIONS

This application claims the benefit of U.S. Provisional Patent Application No. 61/856,176, filed Jul. 19, 2013 and U.S. Provisional Patent Application No. 61/935,599, filed Feb. 4, 2014, the entireties of which is hereby incorporated by reference.

FIELD OF INVENTION

The present invention relates, in general, to exhaust rain caps.

DESCRIPTION OF RELATED ART

It is well known to use exhaust rain caps to cover upstanding exhaust conduits of internal combustion engines and the like. In particular, the exhaust rain caps are adapted to seat on the open end of the conduit when the engine is inoperative to prevent rain and other contaminants from entering the conduit.

Referring to FIGS. 1 and 3, prior exhaust rains caps 100 include a clamping member 102 that engages the outer wall 104 of the exhaust conduit and a cap or lid 106 pivotally attached to the clamping member. In operation, pressure created by gases inside the exhaust conduit pivots the cap upward to permit the gases to escape. When the gases dissipate (e.g., the engine is turned off), gravity forces the cap back into engagement over the conduit's end.

However, in operation, it has been determined that such prior art exhaust rain caps often fail due to the high temperatures, exhaust pressure and/or vehicle vibrations involved. These forces often led the prior vanes 108 on the exhaust rain caps to prematurely break off after a limited amount of use (see FIG. 3). Among other things, the prior pivoting assemblies 110 only permitted the exhaust rain cap to be in either an open position (see FIG. 1) or a closed position (see FIG. 2) with the cap in contact with the end of the conduit. Vibrations and opening and closing of cap in such a way led to fatigue and, ultimately, the premature failure of the vane. Furthermore, only including a fully closed and a fully open position for the exhaust rain caps did not effectively account for the exhaust flow when the engine was idling.

BRIEF SUMMARY OF INVENTION

The present invention comprises an exhaust rain cap that is mountable to the end of an exhaust conduit to permit gases to be expunged from the conduit while keeping contaminants out, and is an improvement over the prior exhaust rain caps in that the way that structure provides for increased strength and durability.

The exhaust rain cap assembly of the present invention includes a bracket or clamp member, a cap or lid, a channel vane member and a pivot assembly. The bracket includes leg members at each end to secure the exhaust rain cap assembly to the end of the exhaust conduit. In particular, one set of leg members may be secured together through a fastener such as, but not limited to a square carriage bolt and nut. The other set of leg members may be used to pivotally attach the channel vane member relative to the bracket.

The channel vane member includes a channel vane that is attached to the cover or lid and a pivot arm that is pivotally attached to the bracket leg members using a pivot pin or other known pivoting member. A counterbalance may be attached to the end of the channel vane member. The inside surface of the counterbalance may include a series of angled segments or surfaces that permit the channel vane member, and thus the cover, to be positioned in a one of a plurality of positions during use. In one embodiment, the counterbalance includes a first angled segment (or first and second angled segments) that interacts with a spacer, bushing or other stop member when the lid is in a closed position. When the engine is in an idling position such that gas pressure in the exhaust conduit exists but is not high, the pressure can push the cover or lid up such that the bushing, spacer or another suitable structure or member engages the second and/or third angled positions to retain the cover or lid in an angled position. When the engine is on, the increased pressure will push the lid open, wherein the counterbalance will rotate such that the third and/or fourth angled surface engage the spacer, bushing or other suitable stopping member to retain the cover or lid in an open position until the pressure in the exhaust conduit subsides. It is appreciated that the exhaust rain cap assembly may be utilized without a counterbalance (e.g., when the weight of the cap is small) and other stop members attached to the vane or the edge forms in the vane body may be used instead of a counterbalance to retain the cover or lid in the closed position or the open position.

Accordingly, it is an object of the present invention to provide an exhaust rain cap assembly that is able to better withstand higher temperatures, pressure and vibrations when in use.

It is another object of the present invention to provide an exhaust rain cap assembly having increased strength and durability.

It is yet another object of the present invention to provide an exhaust rain cap assembly that permits the cover or lid to remain open in a plurality of positions.

These and other objects and features of the present invention will become apparent in view of the following specification, drawings and claims.

DETAILED DESCRIPTION OF INVENTION

Figure 1:
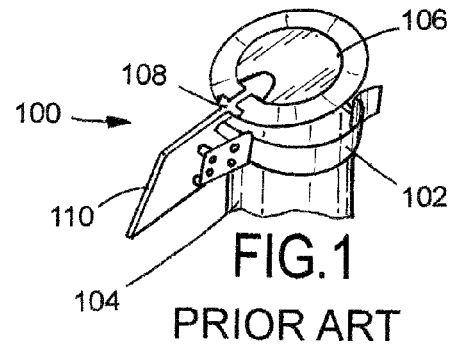
FIG. 1 is a side perspective view of a prior art exhaust rain cap assembly showing the lid in an opened position
Figure 2:
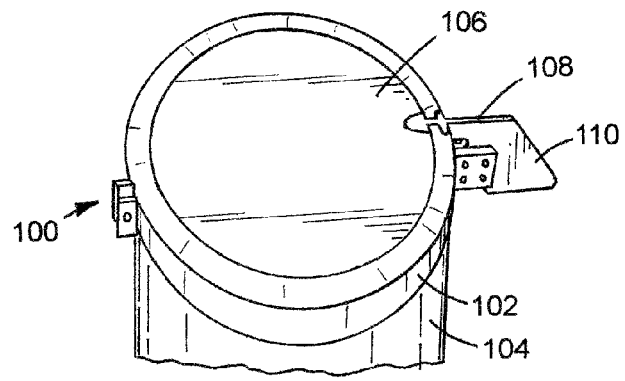
FIG. 2 is a rear perspective view of the prior exhaust art rain cap assembly of FIG. 1 showing the lid in a closed position.
Figure 3:
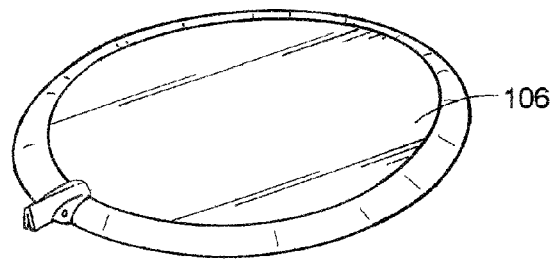
FIG. 3 is a front perspective view of the lid of the prior art exhaust rain cap assembly of FIG. 1 showing the vane broken off.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Referring now to the drawings, and particularly to FIGS. 4-8, one embodiment of the exhaust rain cap assembly of the present invention is shown and disclosed. The exhaust rain cap assembly, generally designated by the reference numeral 10, includes a generally circular band or bracket 12, a cap, cover or lid 14, a channel vane member 16 and a pivot assembly 18.

The band or bracket 12 is adapted to encompass the upper end 22 of the exhaust conduit 20. Corresponding ends 24 of the bracket 12 include leg members 26 that extend outwardly to permit a fastener (not shown) to be inserted therein. In one embodiment, each of the leg members 26 includes a substantially square hole 30 to permit a rectangular carriage bolt 31 to be inserted therein and retained in place by a corresponding threaded nut (not shown). The other ends 32 of the bracket 12 also may include leg members 34 that extend outwardly to permit the bracket 12 to be secured to the pivot assembly 18 and channel vane member 16. While a separated bracket is shown and disclosed, it is appreciated that other types of brackets (including, but not limited to, annular brackets and expandable brackets) may be used and not depart from the scope of the present invention.

Figure 5A:
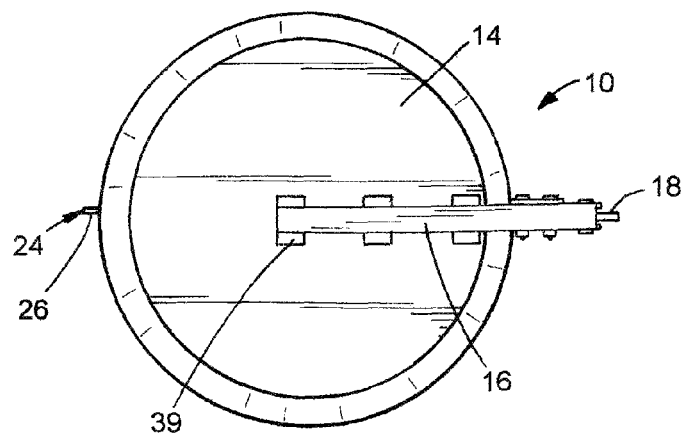
FIG. 5A is a top view of the exhaust rain cap assembly of FIG. 4 with one half of the bracket removed.
Figure 5B:
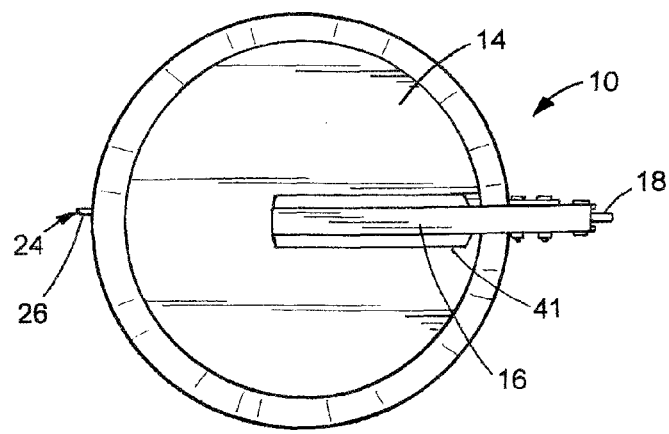
FIG. 5B is an alternate embodiment of the exhaust rain cap assembly of FIG. 4 utilizing flanges.
Figure 12:
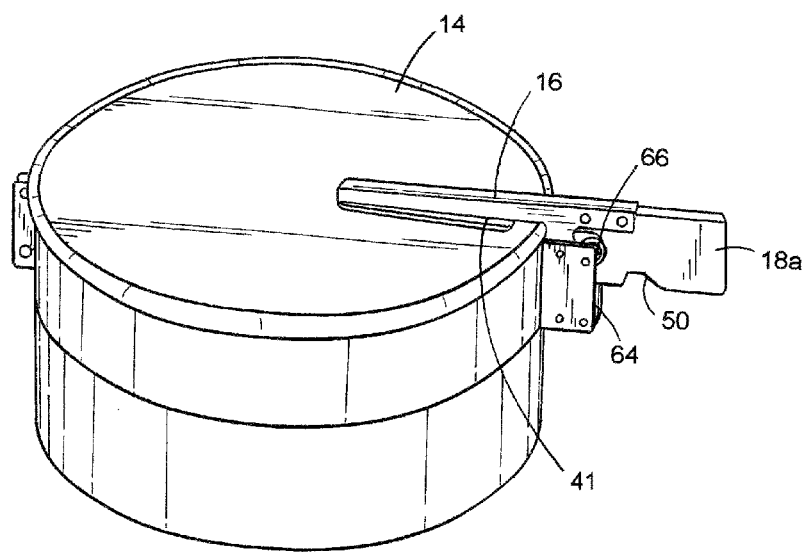
FIG. 12 is a front perspective view showing a fifth embodiment of the exhaust rain cap assembly of the present invention.

The lid, cover or cap 14, which may be made out of stainless steel or other known materials, is sized to cover the opening of the end 22 of the exhaust conduit 20. The channel vane member 16 includes a channel vane 38 and a pivot arm 40. As shown in FIG. 5A, the cap 14 is secured to the pivoting member 18 through the channel vane 38 of the channel vane member 16 using a series of welds at leg members 39. As shown in FIGS. 5B and 12, it is also appreciated that the channel member may include straight edges 41 for use in attaching the channel member 38 to the cap 14. It is further appreciated that the channel vane may be attached to the cap through other known means and not depart from the scope of the invention. Although the embodiment shown in the drawings shows the channel vane extending over around half of the diameter of the cap, it is appreciated that the width and length of the channel vane may vary depending on the size of the cap and/or the particular application for which the exhaust rain cap assembly will be used.

Figure 6:
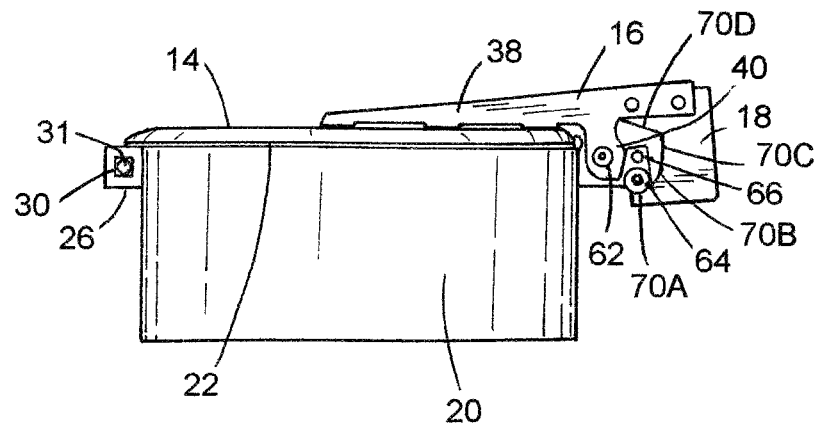
FIG. 6 is a side elevated view of the exhaust rain cap assembly of FIG. 5A.
Figure 7:
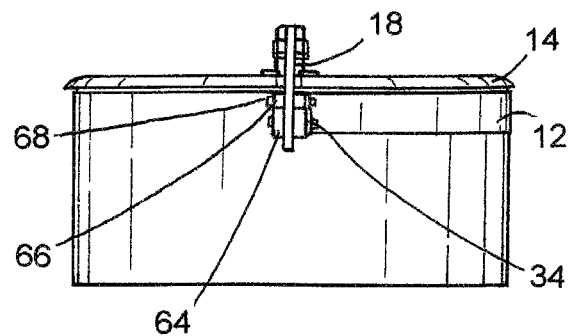
FIG. 7 is a rear elevated view of the exhaust rain cap assembly of FIG. 5A.
Figure 8:
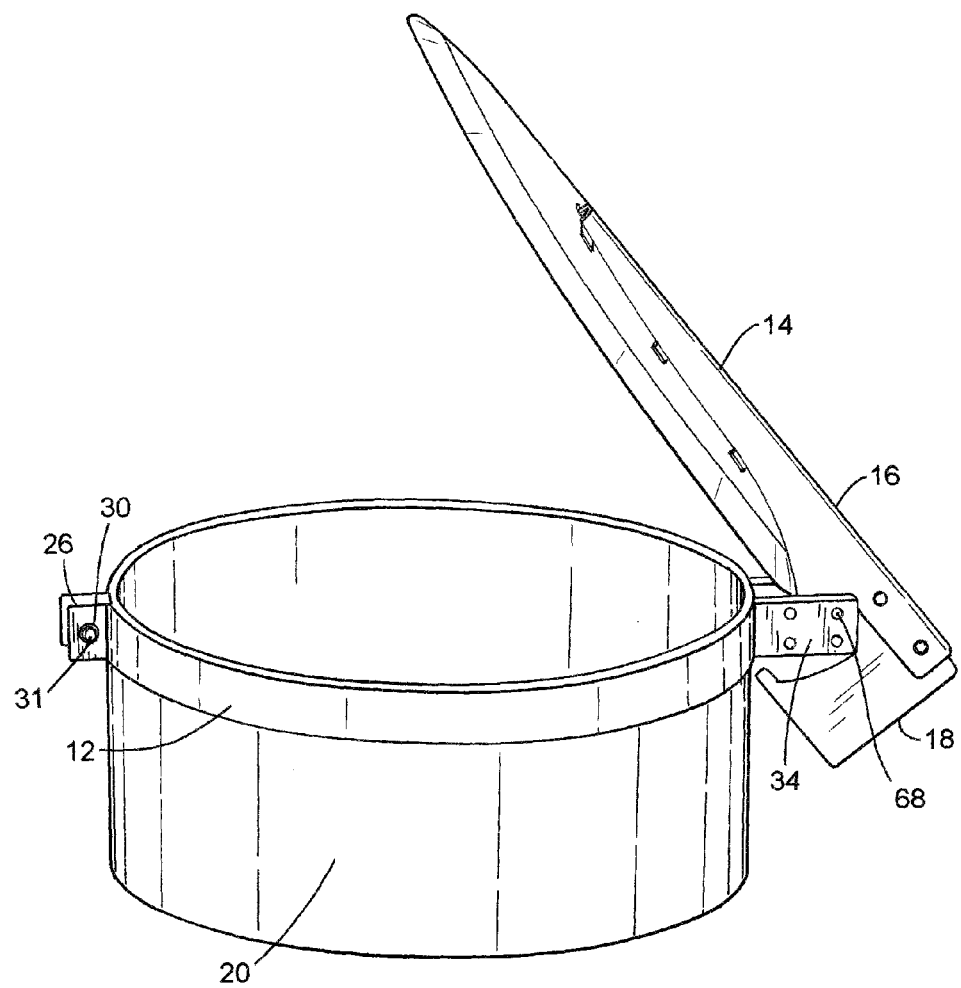
FIG. 8 is a front perspective view of the exhaust rain cap of FIG. 4 in an open position.

Referring to FIG. 6, the pivot arm 40 extends downwardly from the channel vane 38 and includes a hole for accepting a pivot pin 42 between the leg members 34 of the ends 32 of the bracket 12. The pivot arm 40 may include a bushing or similar member 62 for accepting the pivot pin 42. While a pivot pin is disclosed, it is appreciated that other pivoting members may be used and not depart from the scope of the present invention.

Figure 4:
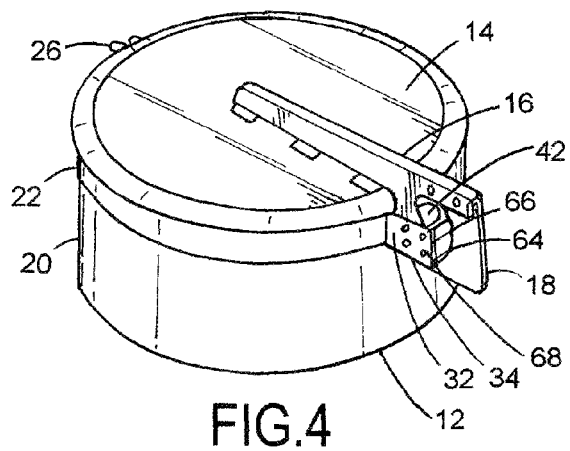
FIG. 4 is a front perspective view of one embodiment of the exhaust rain cap assembly of the present invention.

As shown in FIG. 4, the exhaust rain cap assembly may also include a spacer 64 and/or a second bushing 66 that may be attached between the leg members 34 of the bracket 12 through pins, rivets or other known means 68.

A counterbalance 18 is attached to the end of the channel vane through a pair of rivets or other known attachment means. The inside surface of the counterbalance 18 includes a series of angled segments or surfaces 70A, 70B, 70C & 70D that permit the channel vane member (and thus the lid) to be positioned in a one of a plurality of positions. In particular, the counterbalance 18 includes a first angled segment 70A, or first and second angled segments 70A & 70B, that interact with the spacer 64 or other stop member when the cap 14 is in a closed position. When the engine is in an idling position such that gas pressure in the exhaust conduit 20 exists but is not high, the pressure can push the cap 14 up such that the bushing 66, spacer 64 or another suitable stop structure or member engages the second and/or third angled segment 70B, 70C to retain the lid 14 in a first angled position. When the engine is on and in use, the increased pressure will push the cap 14 open, wherein the counterbalance 18 will rotate such that the third and/or fourth angled segments 70C, 70D engage the spacer 64, bushing 66 or other suitable stopping member to retain the cap 14 in a second open position until the pressure subsides. While a spacer and bushing are used, it is appreciated that other suitable stop members may be used and not depart from the scope of the invention. Furthermore, while angled segments or surfaces are shown and disclosed, it is appreciated that the surfaces may be curved, or a combination of curved and straight surfaces, and not depart from the scope of the present invention. It is also appreciated that an addition weight may be added to counterbalance (through a hole or other known means).

Referring again to FIG. 12, the counterbalance 18a may include a notch 50 on the on its bottom side that is located so as to engage pin or spacer 64 to stop the rotation of the counterbalance 18 and therefor the cap or cover 14.

Figure 9:
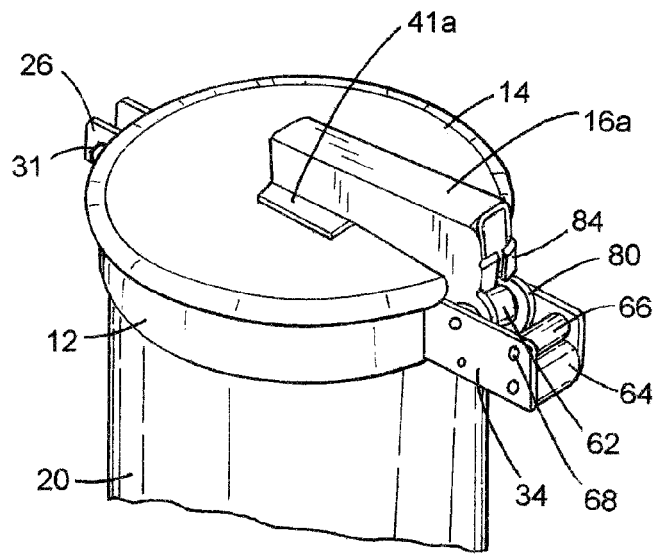
FIG. 9 is a front perspective view showing a second embodiment of the exhaust rain cap assembly of the present invention.
Figure 10:
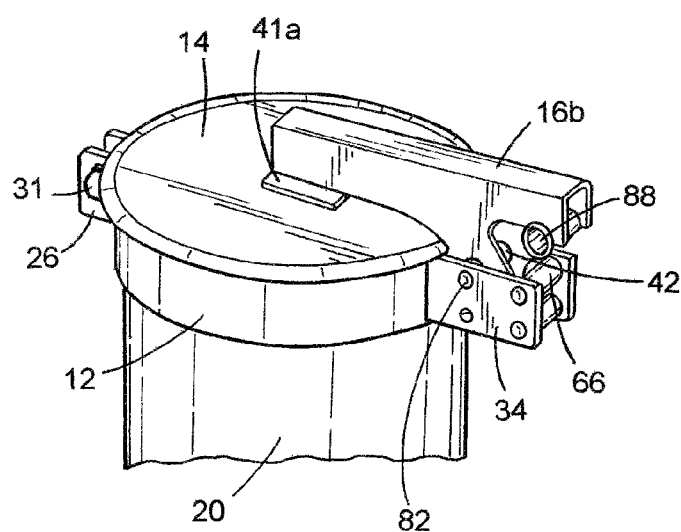
FIG. 10 is a front perspective view showing a third embodiment of the exhaust rain cap assembly of the present invention.
Figure 11:
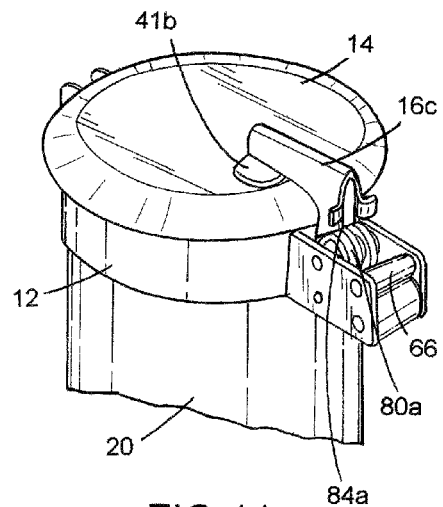
FIG. 11 is a front perspective view showing a fourth embodiment of the exhaust rain cap assembly of the present invention.

Referring to FIGS. 9-11, it is also appreciated that the exhaust rain cap assembly of the present invention may also be used without a counterbalance. For example, in circumstances where the size of the rain cap 14 is smaller in size and thus weight, a counterbalance may not be required to offset the weight of the rain cap. In these instances, one or more stop members attached to the vane or bracket may be used to retain the cover in the closed, open and/or intermediate positions.

Referring to FIG. 9, the channel vane member 16a may include smaller flange members 41a for securing the channel vane member 16a to the cover or lid 14. The end of the channel vane member 16a includes arcuate arm members 80 that facilitate rotation of the channel vane member 16a and cover 14 about pin or cylinder 82. Stop members 84 at the end of the channel vane member 16a are located to engage pin or cylinder 66 to stop or limit the rotational movement of the cap 14.

FIG. 10 illustrates another embodiment of a channel vane member 16b that rotates about pin or cylinder 42 that is attached relative to leg members 34 by rivet or connector 82 until a pin or cylinder 88 located in a recess 90 in the back of the channel vane member 16b engages the pin or cylinder 66 to stop or limit the rotational movement of the cap 14.

FIG. 11 depicts yet another embodiment of a channel vane member 16c. The channel vane member 16c includes smaller curved flange members 41b that may be welded or otherwise attached to the cap 14. The end of the channel vane member 16c includes arcuate arm members 80a that facilitate rotation of the channel vane member 16c and cap 14 about pin or cylinder 42. Stop members 84a at the end of the channel vane member 16c are located to engage pin or cylinder 66 to stop or limit the rotational movement of the cap 14.

In operation, when the engine is off, there is insufficient pressure in the exhaust conduit to push the lid out of engagement with the top of the exhaust conduit. When the engine is turned on and is idling, pressure from the idling engine builds up and is sufficient to force the cap to rotate out of engagement with the end of the exhaust conduit. While pressure from the idling engine is sufficient to move the cap, in the preferred embodiment, it is not sufficient to move the counterbalance past an initial stop, with the second and/or third surfaces engaging at least one of the stop members (e.g., the spacer and/or the bushing). Once the engine is engaged so that it is no longer idling, the pressure in the exhaust conduit increases such that it can move the cap into a second stop or open position, where the third and/or fourth surfaces of the inner surface of the counterbalance engage one or more of the stop members. When the engine is turned off, the pressure subsides wherein the lid may return to a closed position.

It will be understood that modifications and variations may be effected without departing from the spirit and scope of the present invention. It will be appreciated that the present disclosure is intended as an exemplification of the invention and is not intended to limit the invention to the specific embodiment illustrated and described. The disclosure is intended to cover, by the appended claims, all such modifications as fall within the scope of the claims.

What is claimed is:

1. An exhaust rain cap assembly for use in connection with the end of an exhaust conduit, the exhaust rain cap assembly comprising:
   a bracket for encircling at least part of the end of the exhaust conduit;
   a cover having a top side;
   a channel vane member including:
      a channel vane attached to the top side of the cover;
      a pivot arm rotationally attached to the bracket; and
      an end;
   a stop member; and
   a counterbalance attached to the end of the channel vane member, the counterbalance including an inner surface having at least three segments that interact with the stop member to permit the cover to be positioned in a closed position, an intermediate open or idling position and a fully open position.

2. The exhaust rain cap assembly as claimed in claim 1 wherein the stop member includes a spacer.

3. The exhaust rain cap assembly as claimed in claim 2 wherein the stop member further includes a second stop member.

4. The exhaust rain cap assembly as claimed in claim 3 where the second stop member is a bushing.

5. The exhaust rain cap assembly as claimed in claim 1 wherein the first and second segments are obtusely angled relative to one another and the second and third segments are obtusely angled relative to one another.

6. The exhaust rain cap assembly as claimed in claim 1 wherein the at least three segments are four segments.

7. The exhaust rain cap assembly as claimed in claim 1 wherein two of the at least three segments engage the stop member to retain the cover in the intermediate open position until pressure in the exhaust conduit increases to bias the cover into the fully open position.

8. An exhaust rain cap assembly for use in connection with the end of an exhaust conduit, the exhaust rain cap assembly comprising:
   a bracket for encircling at least part of the end of the exhaust conduit;
   a cover having a top side;
   a channel vane member including:
      a channel vane attached to the top side of the cover;
      a pivot arm rotationally attached to the bracket; and
      an end;
   a stop member; and
   a counterbalance attached to the end of the channel vane member, the counterbalance including an inner surface having at least three segments that interact with the stop member to permit the cover to be positioned in at least a first position, a second position and a third position wherein the first and second segments being obtusely angled relative to one another to form a first area for engaging and retaining the stop member in the first position, the second and third segments being obtusely angled relative to one another to form a second area for engaging and retaining the stop member in the second position.

9. The exhaust rain cap assembly as claim in claim 8 which further comprises a fourth segment, wherein the third and fourth segments are angled relative to one another to form a third area for engaging and retaining the stop member in the third position.

10. The exhaust rain cap assembly as claim in claim 9 wherein the first position is a closed position, the second position is an intermediate open position and the third position is a fully open position.

* * * * *